United States Patent Office 2,907,658
Patented Oct. 6, 1959

2,907,658
ANIMAL FEED COMPOSITION AND METHOD OF FEEDING SAID COMPOSITION TO ANIMALS

Herbert G. Luther, Terre Haute, Ind., assignor to Chas. Pfizer & Co., Inc., New York, N.Y., a corporation of Delaware No Drawing. Application September 13, 1957
Serial No. 683,722

5 Claims. (Cl. 99—2)

This application relates generally to animal feed additives. More particularly, it is concerned with a process for stimulating animal growth and with animal feed compositions containing ascorbyl benzoate. It is among the objects of this invention to provide unique and useful feed compositions for guinea pigs and monkeys.

The unique and useful feed additive of this invention is ascorbyl benzoate which possesses a number of novel properties that make it desirable. Among other properties, it is a stable source of ascorbic acid activity, i.e. vitamin C activity. There are in the literature many reports concerning the nutritional value of ascorbic acid, i.e. vitamin C, as a supplemental vitamin particularly for man and certain animals, for example, monkeys and guinea pigs, which are valuable experimental animals. Rhesus monkeys, in particular, are extremely important, valuable animals since they are used in the production of the Salk polio vaccine, the efficacy of which is attested to by numerous articles in the medical literature. Ascorbic acid is added to products used for human and animal consumption to insure minimum daily requirements of vitamin C. Ascorbic acid is a compound characterized by a lactonic ring and an ene-diol structure which is subject to easy oxidation converting ascorbic acid to dehydroascorbic acid. Dehydroascorbic acid is physiologically inefficient. In products containing supplemental vitamin C, the lack of stability of the vitamin presents considerable difficulty, that is, because of the ready-oxidation of ascorbic acid, the products suffer a loss of vitamin C activity.

It has now been found that ascorbyl benzoate provides a source of vitamin C activity suitable for use as an animal feed additive and possessing greater stability to oxidative degradation than ascorbic acid. Not only is the compound of this invention a suitable source of vitamin C activity but it is also found to be an antioxidant which meets the rigid requirement of nontoxicity for use in food and feeds. The rigid requirement of nontoxicity has eliminated many of the more common effective antioxidants for use in products which are consumed by man and animals. It has further been found that the compound of this invention possesses inhibitory activity against microorganisms. Microorganisms are presumed to be involved in rancidity development in foods and feeds containing fats. Ascorbyl benzoate is found to inhibit the growth of organisms such as species of Zygosaccharomyces, Escherichia, Streptococcus, and Pseudomonas.

Comparison tests involving the stability of ascorbyl benzoate and ascorbic acid have demonstrated the superiority of the compound of this invention. Ascorbic acid is oxidized much more readily than ascorbyl benzoate. A test for comparative evaluation of stabilities involves the addition of ascorbic acid and ascorbyl benzoate to samples of typical animal feeds which contain a relatively high fat content. The feeds are allowed to stand under simulated storage conditions for weeks during which time samples are removed and examined for ascorbic acid and ascorbyl benzoate content. The results of these tests indicate the stability of ascorbyl benzoate as being almost four times greater. A determination of the toxicity of ascorbyl benzoate demonstrated that high levels of this substance may be included in basal stock rations. In weanling rats, normal reproduction, lactation, hemoglobin values as well as normal development of internal organisms are noted when ascorbyl benzoate is included at levels up to 1% by weight of a basal stock ration.

The amount of ascorbyl benzoate to be added to feeds varies for different species of animals. In the case of man, the minimum daily requirement of vitamin C is about 30 milligrams which is provided by about 50 milligrams of ascorbyl benzoate. In the case of guinea pigs, the minimum daily required vitamin C is provided by incorporating approximately 0.3 milligram of ascorbic acid per 100 grams of body weight in daily rations. The corresponding amount of ascorbyl benzoate is approximately 0.5 milligram per 100 grams of body weight. In monkeys, for example, the Rhesus monkey, the minimum daily requirement of vitamin C is 0.5 milligram per kilogram of body weight, which is provided by about 0.85 milligram of ascorbyl benzoate. Feed compositions containing the respective ratios of ascorbyl benzoate are administered to the animals and no marked deficiencies of vitamin C are noted. Vitamin C deficiencies, are commonly known and are usually referred to as scorbutic symptoms. The most general of these are subcutaneous hemorrhage, general emaciation, tender joints, teeth abnormalities and gum tenderness. Generally, when amounts of ascorbyl benzoate, larger than the minimum daily requirement, are employed in feed compositions a growth promotion is noted in the animals. Although only 0.5 milligram of ascorbyl benzoate per 100 grams of body weight per daily ration is required to prevent scorbutic symptoms in guinea pigs, larger quantities, for example, approximately 1.2 milligrams per 100 grams of body weight per daily ration results in increased growth of the animals. Increased growth is noted in monkeys when levels of ascorbyl benzoate from about 3 to 4 times the minimum daily requirement are incorporated in the diet. Generally, the inclusion of from about 0.1 milligram to about 1.2 milligrams of ascorbyl benzoate per 100 grams of body weight per daily ration is sufficient to provide antiscorbutic activity. For guinea pigs, the preferred range is from about 0.5 milligram to about 1.2 milligrams of ascorbyl benzoate per 100 pounds of body weight per daily ration; for monkeys, the preferred range is from about 0.1 milligram to about 0.4 milligram of ascorbyl benzoate per 100 pounds of body weight per daily ration. Growth promotion occurs when the upper limit of these ranges is employed. Inclusion of larger amounts of ascorbyl benzoate shows no increase in this effect but is not harmful. These feeds contain sources of protein, carbohydrate, fat and fibre, which may be obtained from grain products such as whole wheat, rolled oats, alfalfa, and wheat bran, and meals, such as soybean oil meal, linseed meal, fish meal and livermeal. Recommended standard feeds for guinea pigs and monkeys contain from about 15% to 25% of protein, from 2% to 5% of fat, from 10% to 15% fibre and 55% to 65% carbohydrate. Such feeds, as provided by Rockland Farms, New City, N.Y., contain an average of about 18.2% protein, 2.8% fat, 12% fibre, 61.5% carbohydrate and 7% ash. Mineral sources such as salts of iron, cobalt, copper, zinc may also be added. Mixtures of various required vitamins, such as vitamins A, C, D, and so forth are also added to these feeds.

Ascorbyl benzoate is prepared by methods well known to the art such as reacting benzoic acid and ascorbic acid in concentrated sulfuric acid, quenching the reaction mixture on ice and obtaining the solid product, which then may be recrystallized from water, dioxane or acetone.

Although only man, monkeys, and guinea pigs require vitamin C supplement in their respective diets for its antiscorbutic activity, it is also found that ascorbic acid promotes the growth of other animals. Further, in animals other than guinea pigs and monkeys, under certain conditions, it is of value particularly with animals in stress, for example, young ruminant animals prior to commencement of rumination and caged layers which experience fatigue. The present invention provides a very stable form of ascorbic acid which is an animal growth promoting factor possessing antiscorbutic activity and suitable for use in animal feed compositions.

The following examples are given by way of illustration and are not to be construed as limitations of this invention many variations of which are possible within the scope or spirit thereof.

EXAMPLE I

To one pound samples of a typical feed mixture containing the following ingredients:

| Ingredient | Amount |
|---|---|
| White corn meal | lbs__ 82.5 |
| Soybean oil meal (44% solvent extracted) | lbs__ 37.5 |
| Wheat middlings | lbs__ 15.0 |
| Whey | lbs__ 4.5 |
| Meat scraps (50%) | lbs__ 4.5 |
| Ground limestone | lbs__ 2.5 |
| Dicalcium phosphate | lbs__ 2.4 |
| Salt, iodized | lbs__ 0.75 |
| $B_{12}$ (10 mg./lb. supplement) | gms__ 20.44 |
| Manganese sulfate | gms__ 18.0 |
| $D_3$ (Delsterol 1500 u./gm.) | gms__ 34.0 |
| Choline chloride (25%) | gms__ 187.5 |
| Vitamin E (Myvamix, 20,000 u./lb.) | gms__ 15.3 |
| Niacin, U.S.P. | gms__ 1.2 |
| Thiamine hydrochloride U.S.P. | mgs__ 135.0 |
| Riboflavin U.S.P. | mgs__ 240.0 |
| Calcium pantothenate | mgs__ 217.6 |
| Pyridoxine hydrochloride, U.S.P. | mgs__ 250.0 | was added 1.65 grams of ascorbyl benzoate, 1 gram ascorbic acid U.S.P. by premixing these amounts in 20 grams of the feed and adding to the remainder. The mixtures were then blended for 20 minutes. Ten gram samples were used for the initial assays for ascorbic acid activity by titration with 2,6-dichlorophenol indophenol dye solution. Bulk samples of this mixture in cloth bags were held in an oven at 30° C. and 70% relative humidity. Assays for ascorbic acid activity were made at weekly intervals. The assay of feeds for ascorbic acid were performed by adding 100 ml. of 3% metaphosphoric acid solution to 10 grams of feed in a 250 ml. flask, shaking for one minute to dissolve the ascorbic acid and filtering to obtain a clear filtrate. Five milliliters of the clear filtrate was then titrated to a permanent pink color. A titration blank containing ascorbic acid free feed was then subtracted.

The assay of feeds for ascorbyl benzoate was performed in the same way employing a 3% metaphosphoric acid solution containing 2 volumes of water and 1 volume of acetone. The results based on the retention of the ascorbic acid activity as given in Table I.

Table I

| Time, Weeks | Ascorbyl Benzoate, percent retained | Ascorbic Acid U.S.P., percent retained |
|---|---|---|
| 1 | 96 | 92 |
| 2 | 94 | 80 |
| 3 | 90 | 80 |
| 4 | 84 | 60 |
| 5 | 81 | 40.5 |
| 6 | 79 | 32 |
| 7 | 77.5 | 24 |
| 8 | 82 | |

From these results, the stability of ascorbyl benzoate over ascorbic acid is obvious.

EXAMPLE II

To one pound samples of a typical feed mixture containing the following ingredients:

| Ingredient | Lbs. |
|---|---|
| Alfalfa leaf meal | 30 |
| Whole wheat ground | 50 |
| Soybean oil meal | 15 |
| Corn oil | 3 |
| Bone meal | 2 | was added 1.65 grams of ascorbyl benzoate and 1 gram ascorbic acid U.S.P. and the resultant mixture treated under the same conditions as Example I. The results are tabulated in Table II.

Table II

| Time, Weeks | Ascorbyl Benzoate, percent retained | Ascorbic Acid U.S.P., percent retained |
|---|---|---|
| 1 | 98 | 92 |
| 2 | 96 | 84 |
| 3 | 94 | 72 |
| 4 | 92 | 60 |
| 5 | 92 | 50 |
| 6 | 90 | 41 |
| 7 | 86 | 35 |
| 8 | 88 | 26 |

From these results, the stability of ascorbyl benzoate over ascorbic acid is obvious.

EXAMPLE III

Monkey feed compositions were prepared having the following ingredients:

| Ingredients | 1 | 2 | 3 | 4 | 5 |
|---|---|---|---|---|---|
| | Lbs. | Lbs. | Lbs. | Lbs. | Lbs. |
| Corn mix | 19.15 | 19.15 | 37.8 | 37.3 | 45.5 |
| Yeast, torula dried | 15.0 | | | 5.0 | 5.0 |
| Yeast, brewers dried | | 15.0 | 15.0 | 5.0 | 5.0 |
| Soybean oil meal (50%) | 20.0 | 20.0 | 10.0 | 10.0 | 10.0 |
| Fish meal (55%) | 20.0 | 20.0 | 15.0 | | 10.0 |
| Fish meal (60%) | 10.0 | 10.0 | 5.0 | 10.0 | 10.0 |
| Meat scraps (65%) | 5.0 | 5.0 | 5.0 | | 5.0 |
| Livermeal | 3.0 | 3.0 | 5.0 | | 3.0 |
| Skim milk dried | 3.0 | 3.0 | 2.0 | | |
| Cottonseed oil | 4.0 | 4.0 | 4.0 | 6.0 | 6.0 |
| Crude casein | | | | 25.0 | |
| Choline chloride (25%) | | | 0.8 | | |

To each 100 lbs. of these ingredients was added the following compositions:

| Ingredients | 1 | 2 | 3 | 4 | 5 |
|---|---|---|---|---|---|
| Vitamin A (10,000 USP units/g.) g | | | 51 | 8 | 8 |
| Vitamin D (3,000 U./g.) g | | | 45 | 29 | 20 |
| Vitamin E (20,000 U./g.) g | 23 | 23 | 23 | 20 | 20 |
| $MnSO_4$ (feeding grade) g | | | 10 | 10 | 10 |
| Ascorbyl Benzoate g | 1 | 1 | 1 | 1 | 1 |
| Vitamin $B_{12}$ mg | 4.8 | 4.8 | 2.5 | 4.8 | 2.0 |

Rhesus monkeys of about 2 kilograms body weight consumed about 100 grams of this feed and showed no scorbutic symptoms.

EXAMPLE IV

A guinea pig feed composition was prepared having the following ingredients:

| Ingredient: | Lbs. |
|---|---|
| Soybean oil meal (44%) | 18.0 |
| Linseed meal (37%) | 4.0 |
| Alfalfa meal (17%) | 20.0 |
| Wheat bran | 15.0 |
| Cornmeal (fine grind) | 10.0 |
| Rolled Oats | 9.5 |
| Dried skim milk powder | 10.0 |
| Dried brewers' yeast | 2.0 |
| Meat scrap (60%) | 3.0 |
| Sucrose | 5.0 |
| Dicalcium phosphate | 1.5 |
| Iodized salt | 0.5 |
| Mineral mix | 0.5 |
| Vitamin mix | 1.0 |

To each 100 lbs. of these ingredients was added the following composition:

(1) Vitamin mix:

| | Grams |
|---|---|
| Vitamin A (250,000 u./g.) | 4.0 |
| Vitamin $D_3$ (3,000 u./g.) | 9.0 |
| Choline chloride (25%) | 50.0 |
| Niacin | 2.0 |
| Ca Pantothenate DL | 2.0 |
| Riboflavin R-4 | 50.0 |
| $B_{12}$ | 90.0 |
| Methionine DL | 131.0 |
| Myvamix (Vit. E) | 2.0 |
| Ascorbyl benzoate | 1.2 |

A mineral mix having the following compositions was also added.

| | Grams |
|---|---|
| $FeSO_4$ | 20.0 |
| $CuSO_4$ | 1.0 |
| $CoCO_3$ | 0.4 |
| $MnSO_4 \cdot H_2O$ | 5.0 |
| $ZnCO_3$ | 3.0 |

Guinea pigs weighing approximately 100 grams consumed approximately 20 grams of this feed per day and showed no scorbutic symptoms.

EXAMPLE V

The process of Example IV was repeated employing 2.6 grams of ascorbyl benzoate per 100 lbs. of feed. Animals fed with these compositions showed no scorbutic symptoms and increased growth.

EXAMPLE VI

One hundred and fifteen Wistar rats were fed a basal diet containing 23% crude protein, 2.1% crude fat, 3.2% crude fibre consisting of a mixture of wheat products, soybean oil meal, meat meal, livermeal, alfalfa, skimmed milk, yeast, vitamins, minerals, and so forth to which was added ascorbyl benzoate at levels of 0.01%, 0.1%, and 1%. The growth rate of weanling rats was observed over a period of 21 weeks. No adverse growth effect was noted at any of these levels of ascorbyl benzoate. Examination of the vital organs, for example, spleen liver, kidneys, intestines, heart, lungs, and testicles revealed no abnormalities. Further no adverse effects on reproduction and lactation were noted.

EXAMPLE VII

The process of Example III was repeated employing 3.5 grams of ascorbyl benzoate per 100 pounds of feed. Growth promotion was noted in monkeys fed at this level of ascorbyl benzoate.

What is claimed is:

1. An animal feed composition which comprises a nutritionally balanced feed together with ascorbyl benzoate.

2. An animal feed composition which comprises nutritionally balanced quantities of protein, fat, fibre, carbohydrate, vitamins, and ascorbyl benzoate.

3. An animal feed composition which comprises a small proportion of ascorbyl benzoate and a major proportion of a standard feed composition containing substantially between 15% and 25% of protein, between 2% and 5% of fat, between 10% and 15% of fibre, between 55% and 65% of carbohydrate together with supplementary vitaminaceous sources.

4. An animal feed composition which comprises protein, carbohydrate, fat, fibre, vitamins and sufficient ascorbyl benzoate to provide from 0.1 to 1.2 milligrams per 100 pounds of body weight per daily ration.

5. A process for promotion of animal growth which comprises administering a nutritionally balanced feed together with ascorbyl benzoate.

References Cited in the file of this patent

UNITED STATES PATENTS

| 2,150,140 | Warnat | Mar. 7, 1939 |
| 2,159,986 | Gray et al. | May 30, 1939 |
| 2,350,435 | Wells | June 6, 1944 |
| 2,703,285 | Luther | Mar. 1, 195 |